United States Patent
Li et al.

(10) Patent No.: US 11,228,245 B2
(45) Date of Patent: Jan. 18, 2022

(54) CONTROL OF A BUCK DC/DC CONVERTER USING APPROXIMATE DYNAMIC PROGRAMMING AND ARTIFICIAL NEURAL NETWORKS

(71) Applicant: The Board of Trustees of The University of Alabama, Tuscaloosa, AL (US)

(72) Inventors: Shuhui Li, Northport, AL (US); Weizhen Dong, Tuscaloosa, AL (US); Xingang Fu, Kingsville, TX (US); Michael Howard Fairbank, Colchester (GB)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 16/778,018

(22) Filed: Jan. 31, 2020

(65) Prior Publication Data

US 2020/0251986 A1 Aug. 6, 2020

Related U.S. Application Data

(60) Provisional application No. 62/799,082, filed on Jan. 31, 2019.

(51) Int. Cl.
*H02M 3/157* (2006.01)
*G06N 3/04* (2006.01)

(52) U.S. Cl.
CPC .......... *H02M 3/157* (2013.01); *G06N 3/0481* (2013.01)

(58) Field of Classification Search
CPC ........ H02M 1/0012; H02M 3/156–158; G06N 3/00; G06N 3/02; G06N 3/0481; G06N 3/084
See application file for complete search history.

(56) References Cited

U.S. PATENT DOCUMENTS

| 10,220,710 B2 * | 3/2019 | Xu ........................ H02M 3/158 |
| 2007/0108953 A1 * | 5/2007 | Latham .................. G05B 11/28 323/283 |

(Continued)

OTHER PUBLICATIONS

S. Venkatanarayanan and M. Saravanan, "Control of SEPIC converter using neural network tuned PI controller," 2013 International Conference on Power, Energy and Control (ICPEC), 2013, pp. 458-462, doi: 10.1109/ICPEC.2013.6527700. (Year: 2013).*

(Continued)

*Primary Examiner* — Fred E Finch, III
(74) *Attorney, Agent, or Firm* — Meunier Carlin & Curfman LLC

(57) ABSTRACT

A dc/dc buck converter controller comprises an artificial neural network (ANN) controller comprising an input layer and an output layer. The input layer receives an error value of a dc/dc buck converter and an integral of the error value. The output layer produces an output error voltage. A pulse-width-modulation (PWM) sliding mode controller (SMC) is configured to receive the output error voltage and produce a control action voltage by multiplying the output error voltage with a PWM gain. A drive circuit is configured to receive the control action voltage and provide a drive voltage to an input switch of the dc/dc buck converter. A PI control block is configured to modify a reference output voltage based on a maximum current constraint input. A locking circuit is configured to maintains the output error voltage at the saturation limit of the PWM SMC to manage a maximum duty cycle constraint.

7 Claims, 9 Drawing Sheets

(56) References Cited

U.S. PATENT DOCUMENTS

| | | | | |
|---|---|---|---|---|
| 2007/0114985 A1* | 5/2007 | Latham | | H02M 3/157 323/283 |
| 2014/0339902 A1* | 11/2014 | Sepe, Jr. | | H02M 3/158 307/80 |
| 2014/0362617 A1* | 12/2014 | Li | | G06N 3/084 363/34 |
| 2016/0226253 A1* | 8/2016 | Abido | | H02J 3/381 |
| 2016/0329714 A1* | 11/2016 | Li | | H02M 1/42 |
| 2018/0203160 A1* | 7/2018 | Dong | | H02J 3/383 |
| 2019/0041948 A1* | 2/2019 | Kelly | | G06N 3/02 |
| 2019/0140453 A1* | 5/2019 | Yi | | H02J 3/385 |
| 2019/0296643 A1* | 9/2019 | Li | | H02J 1/102 |
| 2020/0064782 A1* | 2/2020 | Li | | H02M 1/42 |
| 2020/0266706 A1* | 8/2020 | Schwabe | | H02M 3/1584 |
| 2020/0356733 A1* | 11/2020 | Lesso | | G06N 3/049 |

OTHER PUBLICATIONS

J. Mahdavi, M.R. Nasiri, A. Agah, and A. Emadi, "Application of neural networks and state-space averaging to DC/DC PWM coverts in sliding-mode operation," IEEE/ASME Trans. Mechatronics, 10(1), 2005 pp. 60-67.

A. Rubaai, A.R. Ofoli, L. Burge, and M. Garuba, "Hardware implementation of an adaptive network-based fuzzy controller of DCDC converters," IEEE Trans. Ind. Appl., 41(6), 2005, pp. 1557-1565.

R.J. Wai and L.C. Shih, "Adaptive fuzzy-neural-network design for voltage tracking control of a DC-DC boost converter," IEEE Trans. Power Electron., 27(4), 2012, pp. 2104-2115.

Seiffertt, et al., Chapter 21 from, Reinforcement Learning and Approximate Dynamic Programming for Feedback Control, Edited by F.L. Lewis and D. Liu (eds), IEEE Press / Wiley, 2012, pp. 474-493.

H. Zhang, C. Li, X. Zhang, and Y. Luo, "Data-Driven Robust Approximate Optimal Tracking Control for Unknown General Nonlinear Systems Using Adaptive Dynamic Programming Method," IEEE Trans. Neural Netw., 22(12), 2011, pp. 2226-2236.

S. Li, M. Fairbank, C. Johnson, D.C. Wunsch, E. Alonso, and J.L. Proao, "Artificial neural networks for control of a grid-connected rectifier/inverter under disturbance, dynamic and power converter switching conditions," IEEE Trans. Neural Netw. Learn. Syst., 25(4), 2014, pp. 738-750.

K.M. Tsang, and W.L. Chan. "Cascade controller for DC/DC buck convertor." IEE Proc. Electr, Power Appl., 152(4), (2005), pp. 827-831.

S. Tan, Y.M. Lai and C.K. Tse, "A unified approach to the design of PWM-based sliding-mode voltage controllers for basic DC-DC converters in continuous conduction mode," IEEE Trans. Circuits Syst. I, 53(8), 2006, pp. 1816-1827.

G.F. Franklin, J.D. Powell, M.L. Workman, Digital control of dynamic systems, 2nd edition, Addison-Wesley, 1998, 12 pages.

X. Fu, S. Li, M. Fairbank, D. C. Wunsch, and E. Alonso, "Training recurrent neural networks with the Levenberg-Marquardt algorithm for optimal control of a grid-connected converter," IEEE Trans. Neural Netw. Learn. Syst., 26(9), 2015, pp. 1900-1912.

\* cited by examiner

Output Voltage (V) / Time (sec)    Inductor Current (A) / Time (sec)
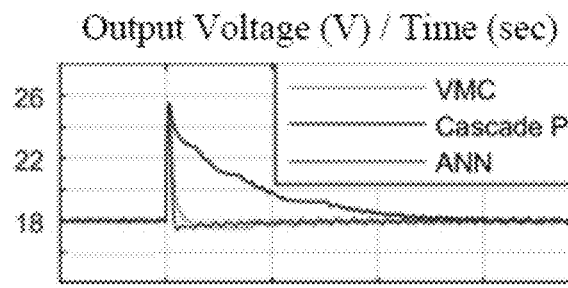
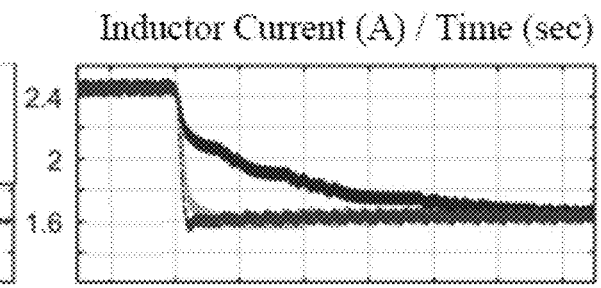
FIG. 7A1                FIG. 7A2
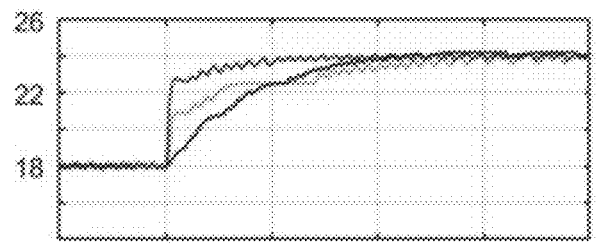
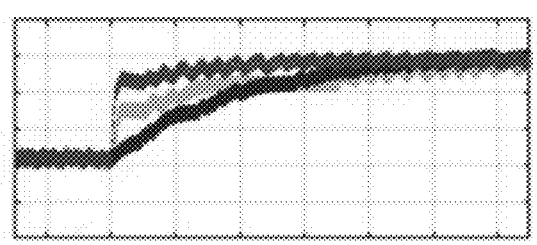
FIG. 7B1                FIG. 7B2
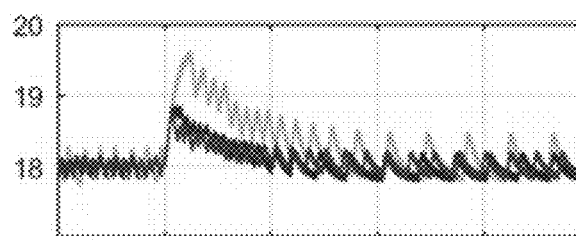
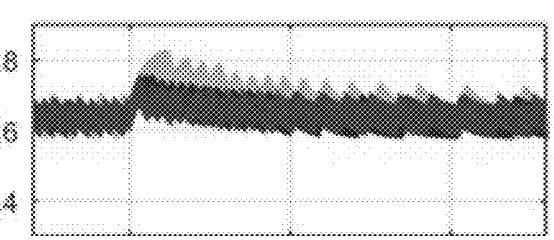
FIG. 7C1                FIG. 7C2
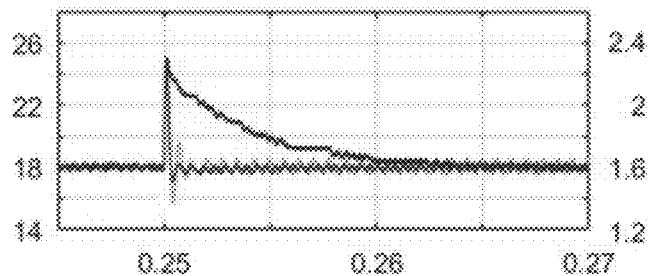
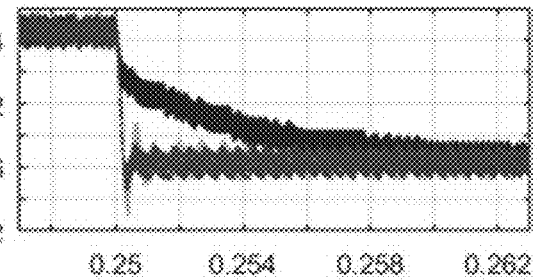
FIG. 7D1                FIG. 7D2

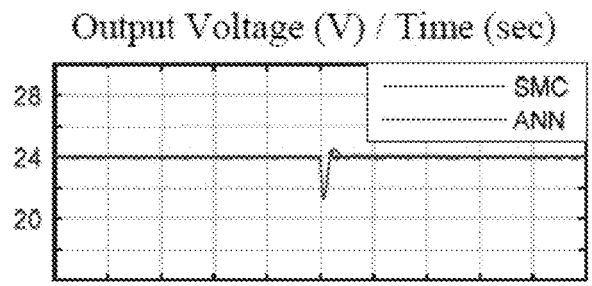
FIG. 8A1
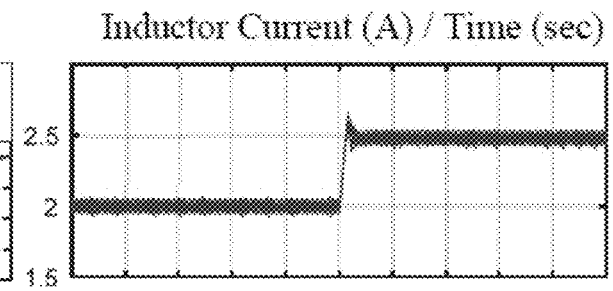
FIG. 8A2
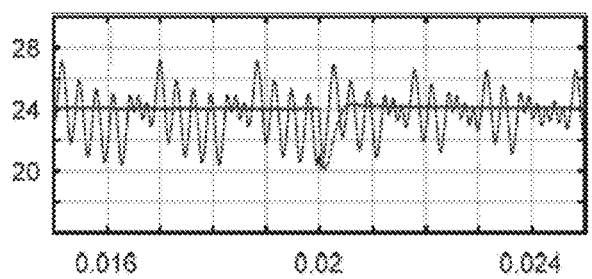
FIG. 8B1
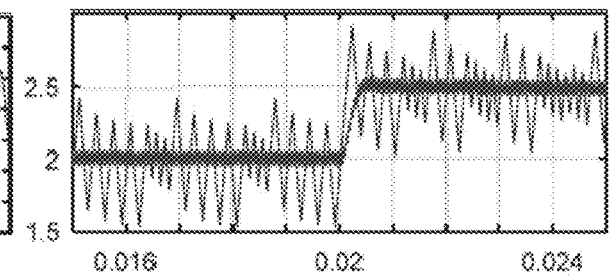
FIG. 8B2
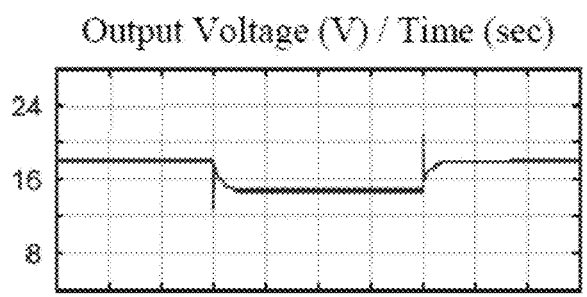
FIG. 9A1
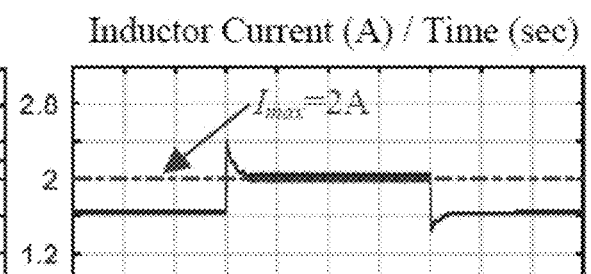
FIG. 9A2
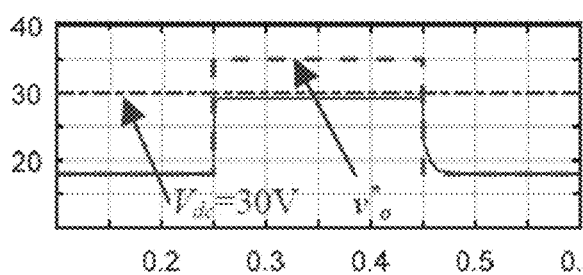
FIG. 9B1
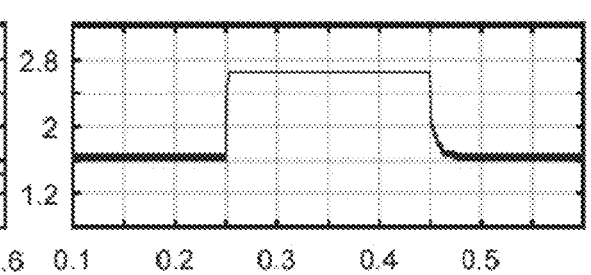
FIG. 9B2

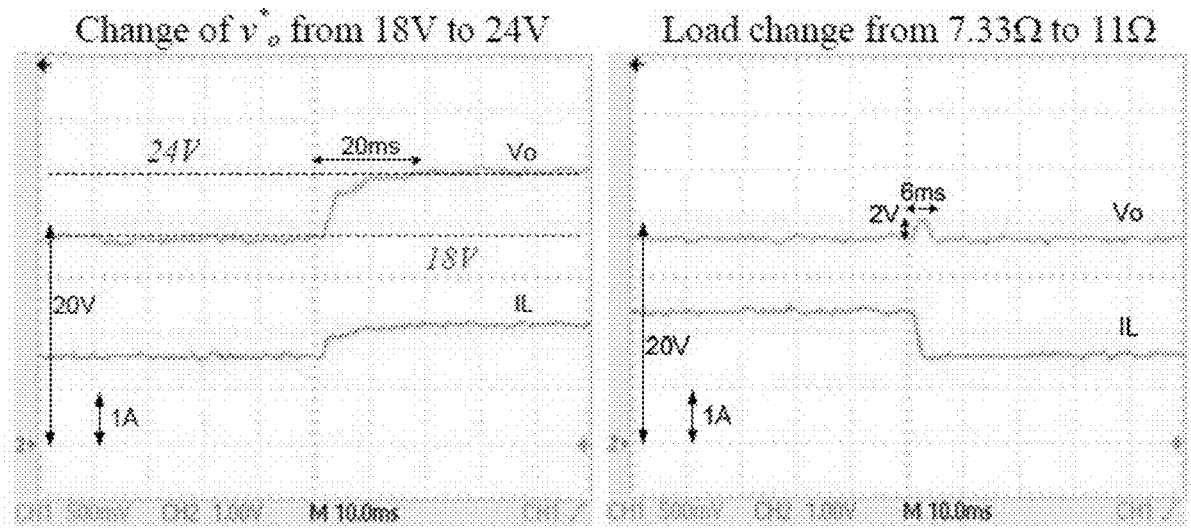
FIG. 11A1　　　　　　　　　　　FIG. 11A2
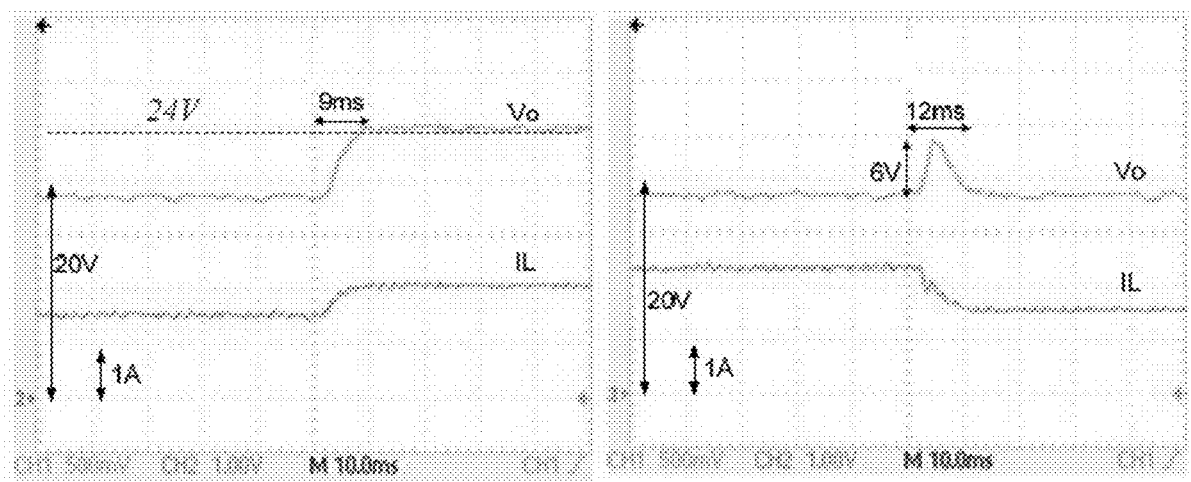
FIG. 11B1　　　　　　　　　　　FIG. 11B2
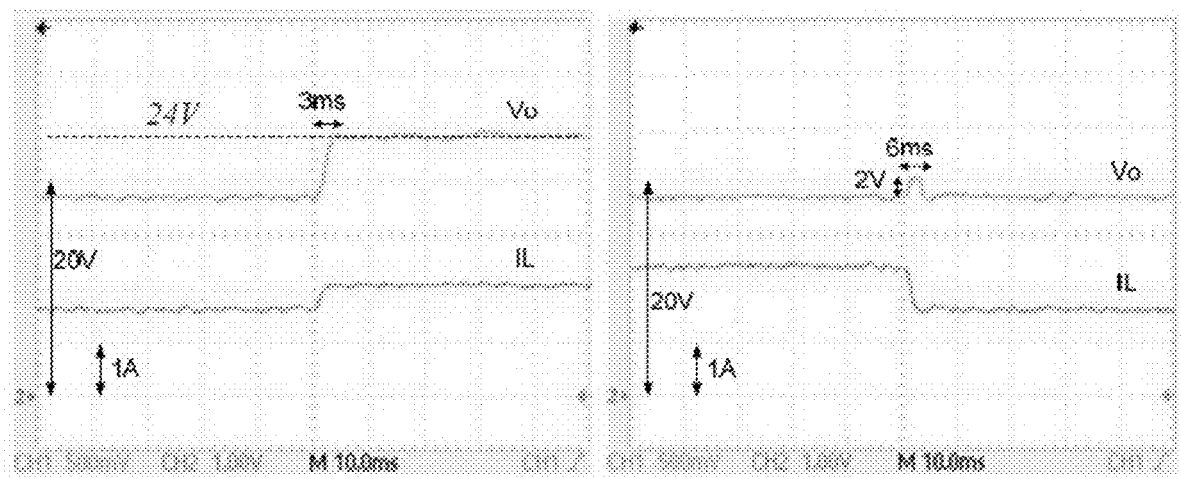
FIG. 11C1　　　　　　　　　　　FIG. 11C2

CONTROL OF A BUCK DC/DC CONVERTER USING APPROXIMATE DYNAMIC PROGRAMMING AND ARTIFICIAL NEURAL NETWORKS

This application claims the benefit of U.S. Provisional Patent Application Ser. No. 62/799,082 filed Jan. 31, 2019, the disclosure of which is expressly incorporated herein by reference.

BACKGROUND

Although artificial neural networks (ANNs) have been applied in dc/dc (direct current to direct current) converter control in recent years. In an example, a feedforward ANN is proposed to implement sliding-mode (SM) based control of a dc/dc Cuk converter. In another example, a fuzzy-neural network control strategy for a dc/dc converter that allows the benefits of an ANN structure to be realized without sacrificing the intuitive nature of the fuzzy system. In a further example, an adaptive fuzzy-neural network control scheme is designed for the voltage tracking of a dc/dc boost converter.

SUMMARY

In a first aspect of the disclosure, a dc/dc buck converter controller comprises an artificial neural network (ANN) controller comprising an input layer and an output layer. The input layer comprises a first input node for receiving an error value of a dc/dc buck converter and a second input node for receiving an integral of the error value. The output layer comprises an output node for producing an output error voltage. A pulse-width-modulation (PWM) sliding mode controller (SMC) is configured to receive the output error voltage and produce a control action voltage by multiplying the output error voltage with a PWM gain. A drive circuit of the dc/dc buck converter configured to receive the control action voltage and provide a drive voltage to an input switch of the dc/dc buck converter.

In some implementations of the first aspect of the disclosure, the first and second input nodes are divided by respective gains and processed through a hyperbolic-tangent activation function.

In some implementations of the first aspect of the disclosure, the ANN controller further comprises two hidden layers. Each node of the hidden layers comprises a hyperbolic-tangent activation function.

In some implementations of the first aspect of the disclosure, the error value is a difference between an output voltage of the dc/dc buck converter and a reference output voltage.

In some implementations of the first aspect of the disclosure, the dc/dc buck converter further comprises a PI control block configured to modify the reference output voltage based on a maximum current constraint input.

In some implementations of the first aspect of the disclosure, the PI control block is further configured to determine a difference between the maximum current constraint input and an inductor current of the dc/dc buck converter.

In some implementations of the first aspect of the disclosure, the PI control block starts when the inductor current of the dc/dc buck converter is greater than the maximum current constraint input.

In some implementations of the first aspect of the disclosure, the PI control block stops when the inductor current of the dc/dc buck converter is less than the maximum current constraint input by a threshold amount.

In some implementations of the first aspect of the disclosure, the dc/dc buck controller further comprises a locking circuit configured to determine when the output error voltage is beyond a saturation limit of the PWM SMC and responsively to lock the error signal at a value where the ANN controller maintains the output error voltage at the saturation limit of the PWM SMC.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 7A1 is an output voltage graph comparing values from conventional voltage mode controller and cascade PI controller as compared to the artificial neural network controller in response to an increased load.

FIG. 7A2 is an inductor current graph comparing values from conventional voltage mode controller and cascade PI controller as compared to the artificial neural network controller in response to an increased load.

FIG. 7B1 is an output voltage graph comparing values from conventional voltage mode controller and cascade PI controller as compared to the artificial neural network controller in response to an increase in a reference output voltage.

FIG. 7B2 is an inductor current graph comparing values from conventional voltage mode controller and cascade PI controller as compared to the artificial neural network controller in response to an increase in a reference output voltage.

FIG. 7C1 is an output voltage graph comparing values from conventional voltage mode controller and cascade PI controller as compared to the artificial neural network controller in response to an increase in an input voltage.

FIG. 7C2 is an inductor current graph comparing values from conventional voltage mode controller and cascade PI controller as compared to the artificial neural network controller in response to an increase in an input voltage.

FIG. 7D1 is an output voltage graph comparing values from conventional voltage mode controller and cascade PI controller as compared to the artificial neural network controller in response to an increased load when the inductor decreases by 50%.

FIG. 7D2 is an inductor current graph comparing values from conventional voltage mode controller and cascade PI controller as compared to the artificial neural network controller in response to an increased load when the inductor decreases by 50%.

FIG. 8A1 is an output voltage graph comparing values from conventional voltage mode controller to the artificial neural network controller under one sampling time.

FIG. 8A2 is an inductor current graph comparing values from conventional voltage mode controller to the artificial neural network controller under one sampling time.

FIG. 8B1 is an output voltage graph comparing values from conventional voltage mode controller to the artificial neural network controller under a different sampling time.

FIG. 8B2 is an inductor current graph comparing values from conventional voltage mode controller to the artificial neural network controller under a different sampling time.

FIG. 9A1 is an output voltage graph of the artificial neural network controller under a maximum inductor current constraint.

FIG. 9A2 is an inductor current graph of the artificial neural network controller under a maximum inductor current constraint.

FIG. 9B1 is an output voltage graph of the artificial neural network controller under a maximum duty-ratio constraint.

FIG. 9B2 is an inductor current graph of the artificial neural network controller under a maximum duty-ratio constraint.

FIG. 11A1 is an output voltage graph comparing a voltage mode controller in response to an increased reference output and in response to an increased load.

FIG. 11A2 is an inductor current graph comparing a voltage mode controller in response to an increased reference output and in response to an increased load.

FIG. 11B1 is an output voltage graph comparing a cascade PI controller in response to an increased reference output and in response to an increased load.

FIG. 11B2 is an inductor current graph comparing a cascade PI controller in response to an increased reference output and in response to an increased load.

FIG. 11C1 is an output voltage graph comparing an artificial neural network controller in response to an increased reference output and in response to an increased load.

FIG. 11C2 is an inductor current graph comparing an artificial neural network controller in response to an increased reference output and in response to an increased load.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

A novel artificial neural network (ANN) based control method for a buck converter is presented herein. The ANN is trained to implement optimal and predictive control based on approximate dynamic programming. The ANN performance is evaluated through simulation and hardware experiments and compared with conventional control methods, which shows that the ANN controller has a strong ability to track rapidly changing reference commands, maintain stable output voltage for variable load, and manage maximum duty-ratio and current constraints.

I. Introduction

ANNs have not been used to implement predictive and optimal control based on approximate dynamic programming (ADP). A different control strategy is proposed herein: an ADP-based ANN control for a buck dc/dc converter. Significant research has been conducted in optimal control of nonlinear systems based on ADP, none of which focuses on dc/dc converter control. In an example, an ANN control strategy has been developed for control of dc/ac inverters based on ADP. The ADP-based ANN control has shown great performance. An ADP-based ANN control for a dc/dc buck converter is disclosed and the performance of ANN control is compared to the traditional control methods for dc/dc buck converters.

II. Conventional Control of Buck Converter

A. Buck Converter Model

Figure 1:
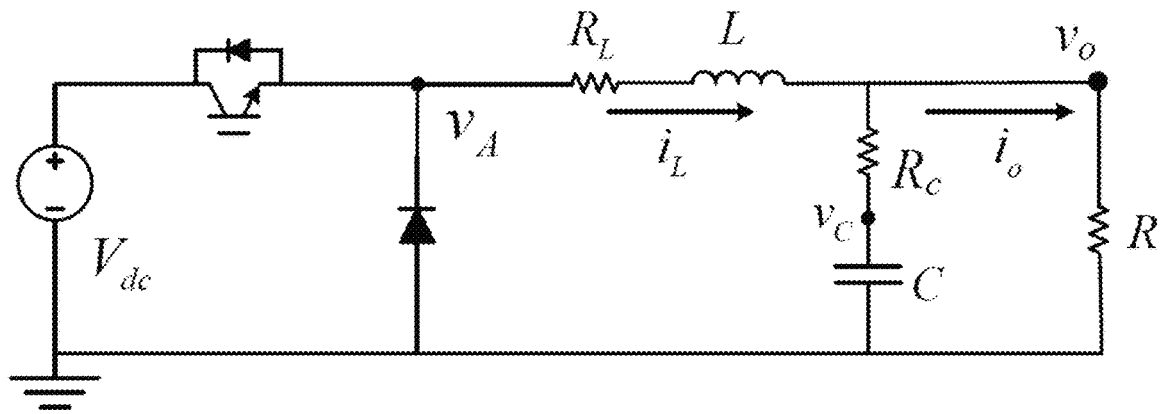
FIG. 1 is a circuit diagram of a dc/dc buck converter with loads.

A basic buck converter is shown in FIG. 1 where $V_{dc}$ represents the input dc voltage. Using the converter average model and the generator sign convention, the voltage and current balance equations across the smoothing inductor and capacitor of the dc/dc converter are:

$$v_A = R_L i_L + L \cdot di_L/dt + v_o \quad (1a)$$

$$C \cdot dv_c/dt = i_L - v_o/R \quad (1b)$$

$$v_o = R_C(i_L - v_o/R) + v_c \quad (1c)$$

where $R_L$ and L are the resistance and inductance of the inductor, $R_C$ and C are the resistance and capacitance of the capacitor, $v_A$ is output voltage of the dc/dc converter, $v_C$ is the capacitor voltage, and $v_o$ is the output voltage to the load R, and $i_L$ is current flowing through the inductor.

Figure 2:
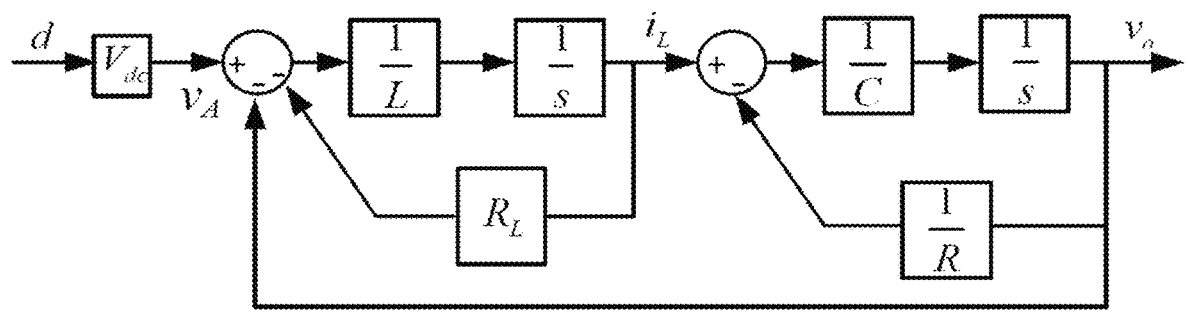
FIG. 2 is a graphical model of the dc/dc buck converter of FIG. 1.
Figure 3:
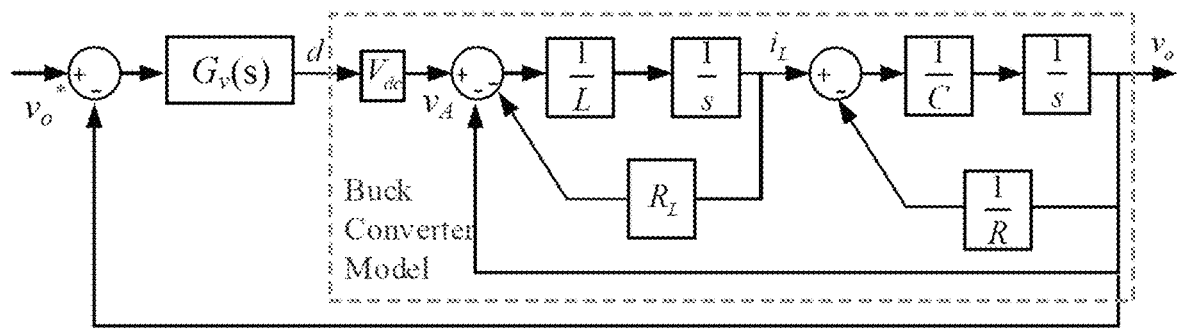
FIG. 3 is a graphical model of a voltage mode controller using the dc/dc buck converter of FIG. 2.

A graphic model of the buck converter as shown in FIG. 2 is usually used for design of a conventional controller, which can be obtained from FIG. 1 or equations (1a)-(1c). In FIG. 2, the impact of the capacitor resistance RC is neglected.

B. Transfer-Function Based Control

Conventional transfer-function based control of a buck converter typically has two modes: voltage mode control (VMC) and cascate or dual voltage-current loop control.

For design of a VMC controller $G_v(s)$, the block diagram of the closed-loop control system is as follows in which $G_v(s)$ is typically a Type-III compensator. Using the Bode plot approach, the cutoff frequency is usually one to two order smaller than the switching frequency.

Figure 4:
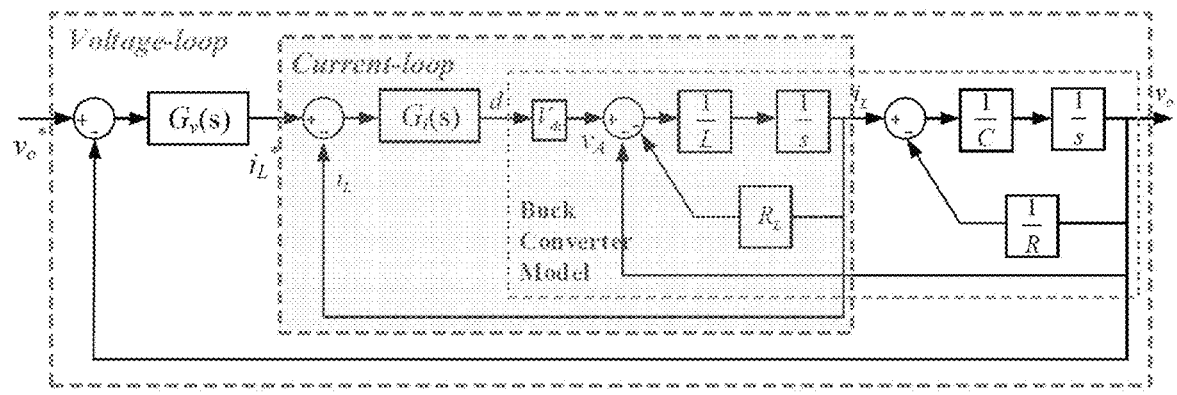
FIG. 4 is a graphical model of a current mode controller using the dc/dc buck converter of FIG. 2.

The cascade control has a nested-loop structure, in which the outer voltage-loop controller generates a reference inductor current to the inner current-loop controller. The overall block diagram of the cascade control is shown by FIG. 4. Using the Bode plot approach, the cutoff frequency of the current-loop controller is one or two order smaller than the switching frequency, and the controller is designed based inner current-loop block diagram. The cutoff frequency of the voltage-loop controller is normally one order smaller than that of the current-loop controller, and the controller is designed based on the outer voltage-loop block diagram, in which the current-loop is generally assumed to be ideal, i.e. 1.

C. Sliding-Mode Based Control

Figure 5:
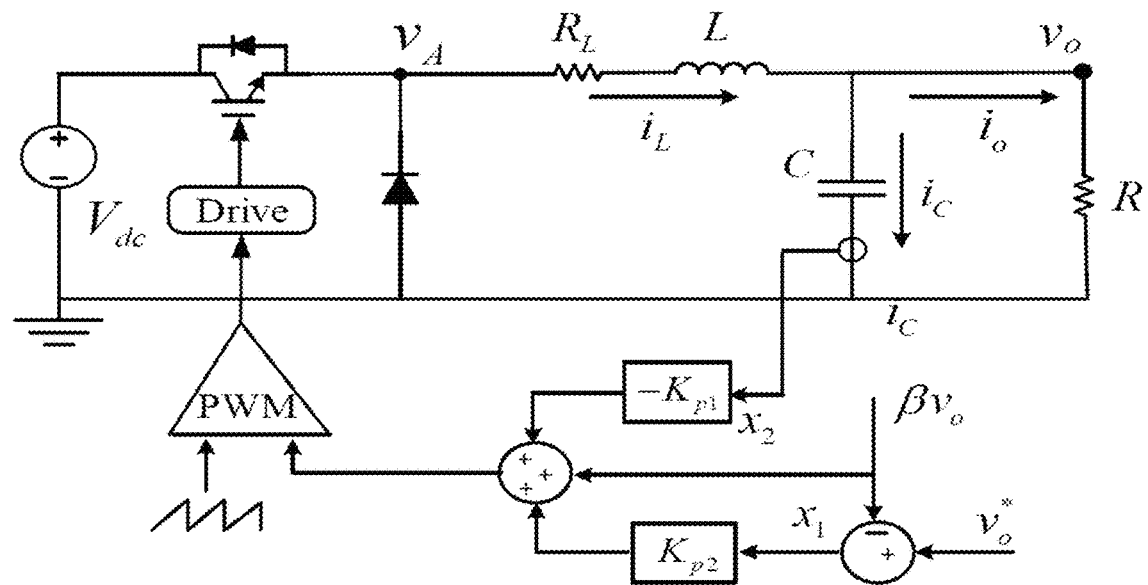
FIG. 5 is a circuit diagram of a sliding mode controller dc/dc buck converter with loads.

Sliding mode control (SMC) is another popular control strategy for a buck converter. Conventionally, hysteresis-modulation (HM) based SMC was used for control of a dc/dc converter. However, a drawback of HM-based SMC is variable switching frequency. Recently, PWM-based SMC was developed to overcome the variable switching frequency issue. FIG. 5 shows a PWM-based SMC approach, in which $K_{p1}$ and $K_{p2}$ can be calculated in terms of converter's parameters L, C and RL.

III. ADP-Based ANN Control of Buck Converter

A. Buck Converter State-Space Model

The ANN controller is developed based on a complete state-space model of the buck converter obtained from equation (1). This involves representing $v_C$ in terms of $v_o$ and $i_L$ first from (1c) as $v_C = v_o - R_C(i_L - v_o/R)$, which replaces the $v_C$ in (1b). Then, combining the (1b) with (1a), the state-space model in terms of $i_L$ and $v_o$ can be obtained as follows:

$$\frac{d}{dt}\begin{bmatrix} i_L \\ v_o \end{bmatrix} = \begin{bmatrix} -R_L/L & -1/L \\ \frac{(L-CR_LR_C)R}{(R+R_C)CL} & -\frac{L+CRR_C}{(R+R_C)CL} \end{bmatrix} \begin{bmatrix} i_L \\ v_o \end{bmatrix} + \begin{bmatrix} 1/L \\ \frac{RR_C}{(R+R_C)L} \end{bmatrix} v_A \quad (2)$$

where the system states are $i_L$ and $v_o$, and $v_A$ is proportional to the output of the ANN controller.

As the ANN controller is a digital controller, a discrete model of (2) is needed. This is obtained via a zero- or first-order hold discrete equivalent mechanism as:

$$\begin{bmatrix} i_L(kT_s+T_s) \\ v_o(kT_s+T_s) \end{bmatrix} = A\begin{bmatrix} i_L(kT_s) \\ v_o(kT_s) \end{bmatrix} + B\begin{bmatrix} v_A(kT_s) \\ 0 \end{bmatrix} \quad (3)$$

$$\begin{bmatrix} i_L(k+1) \\ v_o(k+1) \end{bmatrix} = A\begin{bmatrix} i_L(k) \\ v_o(k) \end{bmatrix} + B\begin{bmatrix} v_A(k) \\ 0 \end{bmatrix}, \quad (4)$$

in which $T_s$ represents the sampling time, A is the system matrix, and B is the input matrix. Note: matrices A and B are obtained from (2) based on a chosen discrete equivalent mechanism. Since $T_s$ is present on both sides, (3) can be simplified as (4) where k is an integer time step.

B. ANN Control Structure

Figure 6:
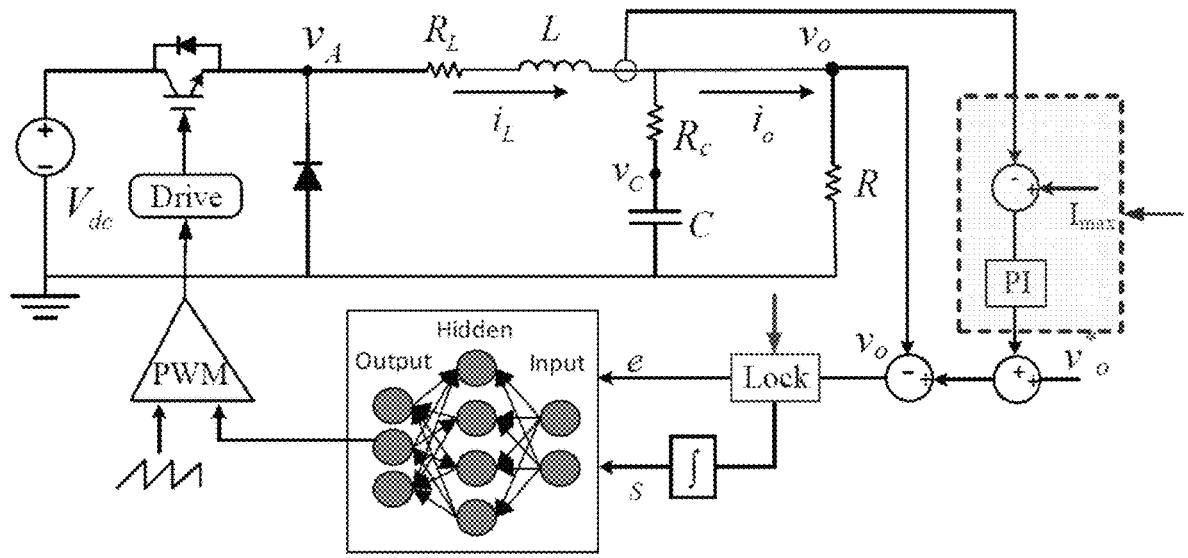
FIG. 6 is a circuit diagram of an artificial neural network controller dc/dc buck converter with loads.

The overall ANN control structure is shown in the lower part of FIG. 6. The ANN includes of four different layers: an input layer, two hidden layers, and an output layer. The input layer contains two inputs: the error term and the integral of the error term as defined by:

$$e_{v_o}(k) = v_o(k) - v_o^*(k), \ s_{v_o}(k) = \int_0^k e_{v_o}(t) dt, \quad (5)$$

where $v_o^*(k)$ is the reference output voltage.

The two inputs are divided by their appropriate gains, and then processed through a hyperbolic-tangent function. The input layer then feeds into the hidden layers. Each node at the hidden layers uses a hyperbolic-tangent activation function. Finally, the output layer gives $v_A^*(k)$, the output of the ANN. This output is multiplied by a gain, $k_{PWM}$, which represents the pulse-width-modulation (PWM) gain, to obtain the final control action or output voltage of the dc/dc converter, $v_A$, given by:

$$v_A(k) = k_{PWM} \cdot A(e_{v_o}(k), s_{v_o}(k), \vec{w}), \quad (6)$$

where $\vec{w}$ represents the network's overall weight vector, and A(■) denotes the whole ANN.

C. Training the ANN Controller

The ANN is trained to achieve optimal control based on ADP. The ADP cost-to-go function used for control of the dc/dc converter is:

$$C(v_o) = \sum_{k=1}^{N} [v_o(k) - v_o^*(k)]^2 \quad (7)$$

To achieve the ADP-based optimal control, we would need to minimize the cost-to-go function (7) through training the ANN. In the closed-loop control environment, the ANN has the recurrent network nature as the output of the dc/dc converter serves as a feedback to the input of the ANN at the next time step, so that the trained ANN could obtain certain predictive control ability. For training the recurrent system, the gradient of (7) with respect to the weight vector, $\partial C/\partial \vec{w}$, is calculated through the chain rule. The calculation starts from (7) and passes through (4), (6) and (5), and then feeds these derivatives into the next time step's ANN inputs, via the chain-rule. After that, the $$\vec{w}_{update} = \vec{w} + \Delta \vec{w} \quad (8)$$

adjustment of network weights $\Delta \vec{w}$ for a training epoch can be obtained, and the network weights are updated by Based on the above procedure and (8), an ANN is trained repeatedly to track a set of randomly generated reference output voltage trajectories during a training experiment. Each training experiment starts with randomly generated network weights. The impact of load and input voltage variations are considered as noises in each training experiment. Since each experiment starts with randomly generated weights, each may converge to different ADP cost. The final network weights are selected from the experiments having the lowest ADP cost.

Note: the ANN is trained offline and there is no further training involved at the real-time control stage. The Levenberg-Marquardt (LM) algorithm is used to train the network, and the Jacobian matrix needed by LM algorithm is calculated via a Forward Accumulation Through Time (FATT) algorithm. A more detailed description about training the recurrent network using LM and FATT algorithms is available in X. Fu, S. Li, M. Fairbank, D. C. Wunsch, and E. Alonso, "Training recurrent neural networks with the Levenberg-Marquardt algorithm for optimal control of a grid-connected converter," IEEE Trans. Neural Netw. Learn. Syst., 26(9), 2015, pp. 1900-1912, hereby incorporated by reference in its entirety.

D. Maximum Duty-Ratio and Current Limitations

During the real-time control stage, it is possible that the controller output voltage may be beyond the maximum duty cycle constraint or the inductor current may be beyond the maximum inductor current limit.

To handle the maximum duty cycle constraint, a locking mechanism (FIG. 6) is developed with the ANN controller. The mechanism first detects whether the controller output voltage is beyond the PWM saturation limit. If so, the error signal passed to the ANN controller will be blocked and the controller just maintains the output voltage at the maximum duty cycle until there is a potential to draw the ANN controller out of the PWM saturation limit. In other words the locking mechanism locks the error signal at a value at which the ANN controller produces an output voltage at the PWM saturation limit.

To handle the maximum inductor current constraint, a PI (proportional integral) control block (FIG. 6) is added to adjust the reference output voltage. However, this PI control block only starts when the actual inductor current is over the maximum current constraint and stops when the actual inductor current is about 2% below the maximum current constraint.

IV. Simulation and Experiment Evaluation

The parameters of the dc/dc buck converter used in the evaluation are as follows: $R_L=0.3\Omega$, $L=5.63$ mH, $R_C=0.02\Omega$, and $C=5$ μF. The nominal input voltage is 42V. Based on the parameters, the ANN controller was trained according to ADP. The conventional VMC and cascade PI controllers were tuned based on Section II-B and the phase-margin is 60°. The SMC controller was tuned according to Section II-C. For each control action, the computation time in MATLAB Simulink environment is about 20 μs for the ANN controller and around 1 μs for the conventional controllers.

A. Simulation Evaluation

The simulation models of traditional and ANN controlled dc/dc buck converter were built using SimPowerSystems. FIGS. 7A1-7D2 compare the control of the buck converter using VMC, Cascade PI and ANN. The switching frequency is 20 kHz and sampling time is 0.1 ms. The evaluation focuses on output voltage and inductor current under different conditions, which shows that the ANN controller has a better performance.

FIGS. 8A1-8B2 compare ANN and SMC under different sampling times at a switching frequency of 100 kHz. It was found through the study that the SMC usually requires high sampling rate and high switching frequency for adequate results, which is consistent with previous research findings.

Regarding the maximum duty-ratio and inductor current constraints, the ANN can properly handle both constraints as shown by FIGS. 9A1-9B2 using the strategies presented in Section III-D. In FIGS. 9A1-9B2, the switching frequency is 20 kHz and sampling time is 100 μs. For conventional control methods, it was found that the Cascade PI and SMC can handle the inductor current, but not the duty-ratio constraint properly while the VMC can manage the duty-ratio, but not the inductor current constraint.

B. Hardware Experiment Evaluation

Figure 10:
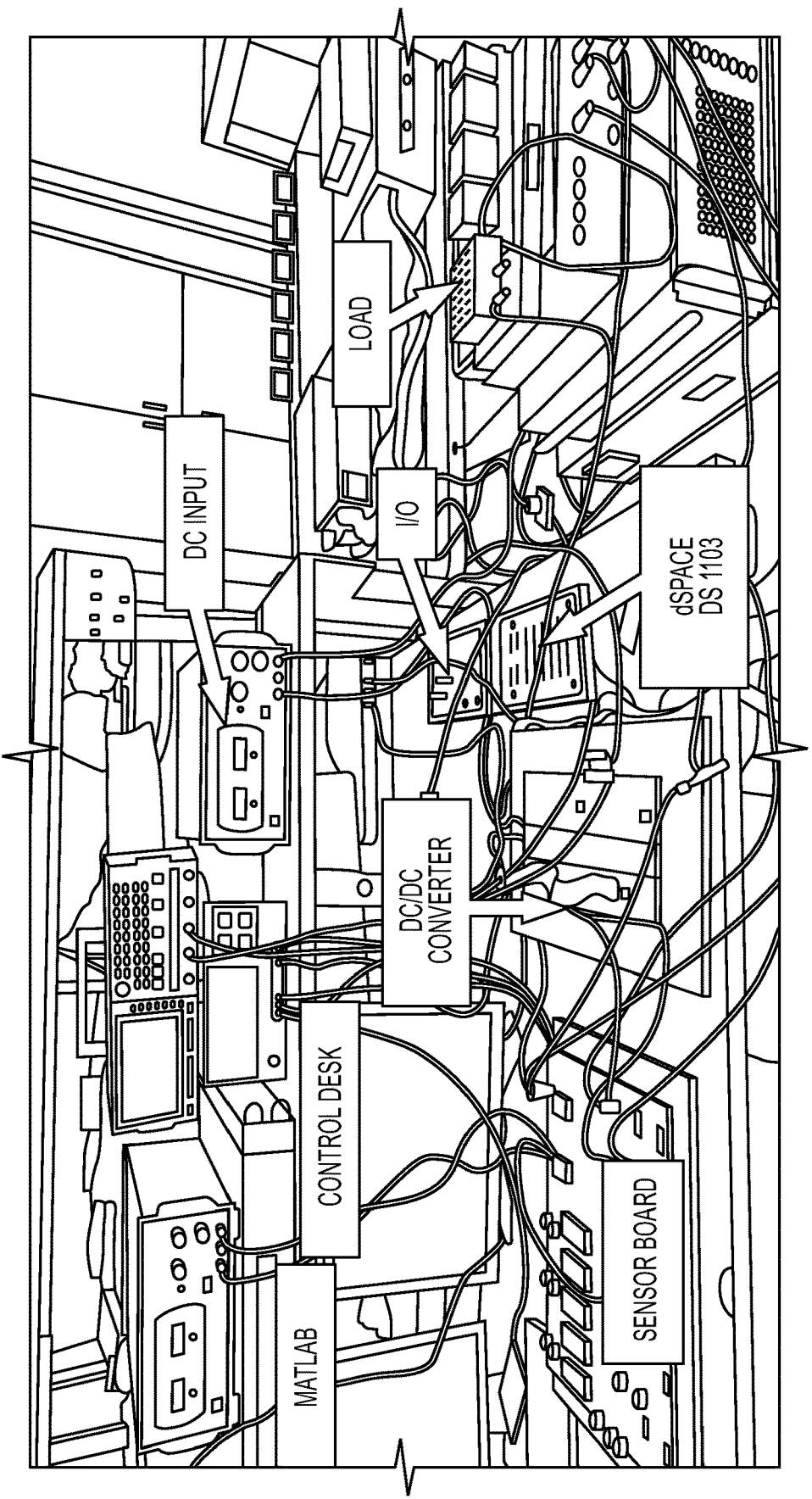
FIG. 10 is an example hardware implementation of the artificial neural network controller.

FIG. 10 shows the experiment setup, in which the dc/dc converter was formulated by using one lag of a three-phase inverter and the ANN controller is implemented by using a DS1103 controller board provided by dSPACE. The buck converter is built based on an IGBT (insulated-gate bipolar transistor) converter with the maximum allowable switching frequency of 20 kHz. For both the ANN and conventional controllers, the converter switching frequency is 10 kHz and the controller sampling time is 0.1 ms.

Figure 12A:
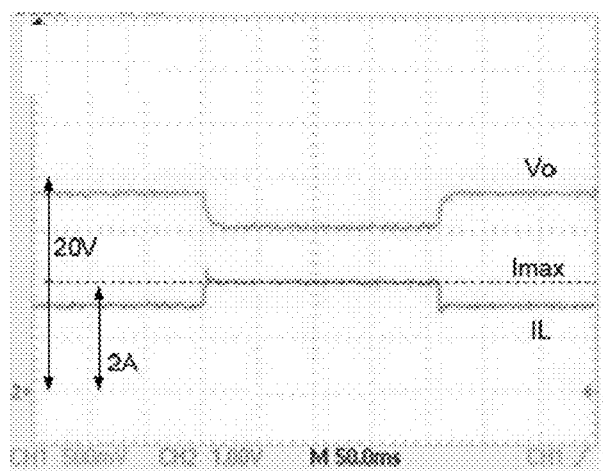
FIG. 12A is an output voltage and inductor current graph of the artificial neural network controller under an inductor current constraint.
Figure 12B:
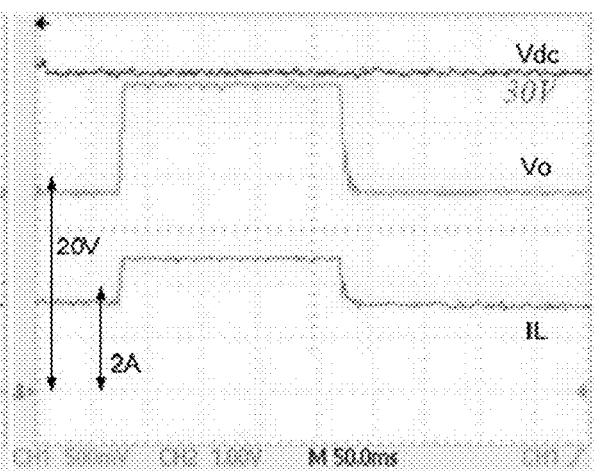
FIG. 12B is an output voltage and inductor current graph of the artificial neural network controller under a duty-ratio constraint.

FIGS. 11A1-11C2 show a comparison result. Again, the ANN shows less overshoot and fast response speed in tracking reference output voltage changes (left), much stronger ability in maintaining output voltage stability under variable load conditions (right). FIGS. 12A and 12B show that the ANN controller can handle the maximum duty-ratio and inductor current constraints properly.

V. Conclusion

Disclosed is an ANN-based optimal and predictive control based on ADP for dc/dc buck converters. Compared to conventional control methods, the ANN controller shows better performance in various aspects, even at low sampling rate and switching frequency. In addition, the ANN controller can handle both the maximum inductor current and duty ratio constraints properly. The hardware experiment confirmed that the ANN controller is able to track reference commands, maintain output voltage stability under variable load and input voltage conditions, and manage maximum duty-ratio and inductor current constraints properly, making it feasible to implement the ANN-based control in practical dc/dc converter applications.

It should be appreciated that the logical operations described herein with respect to the various figures may be implemented 1) as a sequence of computer implemented acts or program modules (i.e., software) running on a computing device (e.g., the computing device described in FIG. 13), 2) as interconnected machine logic circuits or circuit modules (i.e., hardware) within the computing device and/or 3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 13:
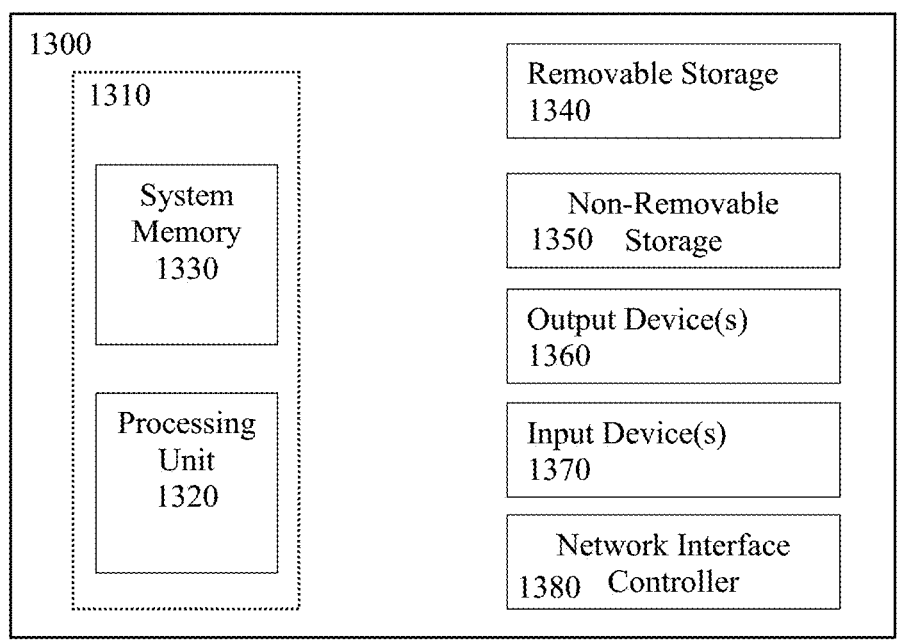
FIG. 13 is an example computing device upon which various embodiments of the invention may be implemented.

Referring to FIG. 13, an example computing device 1300 upon which embodiments of the invention may be implemented is illustrated. For example, the ANN controller board described herein may each be implemented on a computing device, such as computing device 1300. It should be understood that the example computing device 1300 is only one example of a suitable computing environment upon which embodiments of the invention may be implemented. Optionally, the computing device 1300 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 1300 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 1300 to provide the functionality of a number of servers that is not directly bound to the number of computers in the computing device 1300. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 1300 typically includes at least one processing unit 1320 and system memory 1330. Depending on the exact configuration and type of computing device, system memory 1330 may be volatile (such as random access memory (RAM)), non-volatile (such as read-only memory (ROM), flash memory, etc.), or some combination of the two. This most basic configuration is illustrated in FIG. 13 by dashed line 1310. The processing unit 1320 may be a standard programmable processor that performs arithmetic and logic operations necessary for operation of the computing device 1300. While only one processing unit 1320 is shown, multiple processors may be present. Thus, while instructions may be discussed as executed by a processor, the instructions may be executed simultaneously, serially, or otherwise executed by one or multiple processors. The computing device 1300 may also include a bus or other communication mechanism for communicating information among various components of the computing device 1300.

Computing device 1300 may have additional features/functionality. For example, computing device 1300 may include additional storage such as removable storage 1340 and non-removable storage 1350 including, but not limited to, magnetic or optical disks or tapes. Computing device 1300 may also contain network connection(s) 1380 that allow the device to communicate with other devices such as over the communication pathways described herein. The network connection(s) 1380 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1300 may also have input device(s) 1370 such as a keyboards, keypads, switches, dials, mice, track balls, touch screens, voice recognizers, card readers, paper tape readers, or other well-known input devices. Output device(s) 1360 such as a printers, video monitors, liquid crystal displays (LCDs), touch screen displays, displays, speakers, etc. may also be included. The additional devices may be connected to the bus in order to facilitate communication of data among the components of the computing device 1300. All these devices are well known in the art and need not be discussed at length here.

The processing unit 1320 may be configured to execute program code encoded in tangible, computer-readable media. Tangible, computer-readable media refers to any media that is capable of providing data that causes the computing device 1300 (i.e., a machine) to operate in a particular fashion. Various computer-readable media may be utilized to provide instructions to the processing unit 1320 for execution. Example tangible, computer-readable media may include, but is not limited to, volatile media, non-volatile media, removable media and non-removable media implemented in any method or technology for storage of information such as computer readable instructions, data structures, program modules or other data. System memory 1330, removable storage 1340, and non-removable storage 1350 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1320 may execute program code stored in the system memory 1330. For example, the bus may carry data to the system memory 1330, from which the processing unit 1320 receives and executes instructions. The data received by the system memory 1330 may optionally be stored on the removable storage 1340 or the non-removable storage 1350 before or after execution by the processing unit 1320.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dc/dc buck converter controller, comprising:
an artificial neural network (ANN) controller comprising an input layer and an output layer, the input layer comprises a first input node for receiving an error value of a dc/dc buck converter and a second input node for receiving an integral of the error value, the output layer comprises an output node for producing an output error voltage, wherein the error value is a difference between an output voltage of the dc/dc buck converter and a reference output voltage;
a pulse-width-modulation (PWM) sliding mode controller (SMC) configured to receive the output error voltage and produce a control action voltage by multiplying the output error voltage with a PWM gain;
a drive circuit of the dc/dc buck converter configured to receive the control action voltage and provide a drive voltage to an input switch of the dc/dc buck converter; and
a PI control block configured to modify the reference output voltage based on a maximum current constraint input, wherein the PI control block is further configured to determine a difference between the maximum current constraint input and an inductor current of the dc/dc buck converter, wherein the PI control block starts when the inductor current of the dc/dc buck converter is greater than the maximum current constraint input.

2. The dc/dc buck converter controller of claim 1, wherein the first and second input nodes are divided by respective gains and processed through a hyperbolic-tangent activation function.

3. The dc/dc buck converter controller of claim 1, wherein the ANN controller further comprises two hidden layers.

4. The dc/dc buck converter controller of claim 3, wherein each node of the hidden layers comprises a hyperbolic-tangent activation function.

5. The dc/dc buck converter controller of claim 1, wherein the PI control block stops when the inductor current of the dc/dc buck converter is less than the maximum current constraint input by a threshold amount.

6. The dc/dc buck converter controller of claim 1, further comprising:
   a locking circuit configured to determine when the output error voltage is beyond a saturation limit of the PWM SMC and responsively to lock the error signal at a value where the ANN controller maintains the output error voltage at the saturation limit of the PWM SMC.

7. The dc/dc buck converter controller of claim 1, wherein the ANN controller is trained with approximate dynamic programming to minimize a cost-to-go function.

\* \* \* \* \*